United States Patent [19]

Garrett

[11] 4,063,419
[45] Dec. 20, 1977

[54] ENERGY PRODUCTION FROM SOLAR PONDS

[76] Inventor: Donald E. Garrett, 505 W. Ninth St., Claremont, Calif. 91711

[21] Appl. No.: 741,334

[22] Filed: Nov. 12, 1976

[51] Int. Cl.$^2$ .............................................. F03G 7/02
[52] U.S. Cl. ...................................... 60/641; 60/671; 126/271; 122/31 R; 165/45
[58] Field of Search .................. 60/641, 651, 671; 126/270, 271; 165/45; 122/31 R

[56] References Cited

U.S. PATENT DOCUMENTS

| | | | |
|---|---|---|---|
| 659,450 | 10/1900 | McHenry | 60/641 |
| 3,077,190 | 2/1963 | Allen | 126/271 |
| 3,152,442 | 10/1964 | Rowekamp | 126/271 X |
| 3,939,819 | 2/1976 | Minardi | 126/271 |
| 3,951,128 | 4/1976 | Schoenfelder | 126/271 |
| 3,988,895 | 11/1976 | Sheinbaum | 60/641 |

Primary Examiner—Allen M. Ostrager

[57] ABSTRACT

A method for obtaining solar energy in a useful form by utilizing solar ponds, the method comprising direct or indirect contact of hot liquid from the pond with a low boiling point immiscible working fluid for transfer of the heat energy from the liquid to the working fluid. Subsequently, the heated working fluid is separated from the liquid and flash evaporated to provide hot high pressure vapors which are led to a turbine or similar working device to produce electricity. The spent vapors are thereafter condensed and reused in the system. The solar ponds employ a covering agent to minimize evaporation of the liquid and thus provide for a maximum internal heat building. Additionally, light absorbing dyes may be added to the pond liquid to improve solar absorbing efficiency. The pond liquids may alternatively be used for a medium thermal requirement process or supplying heat source for a building structure.

31 Claims, 1 Drawing Figure

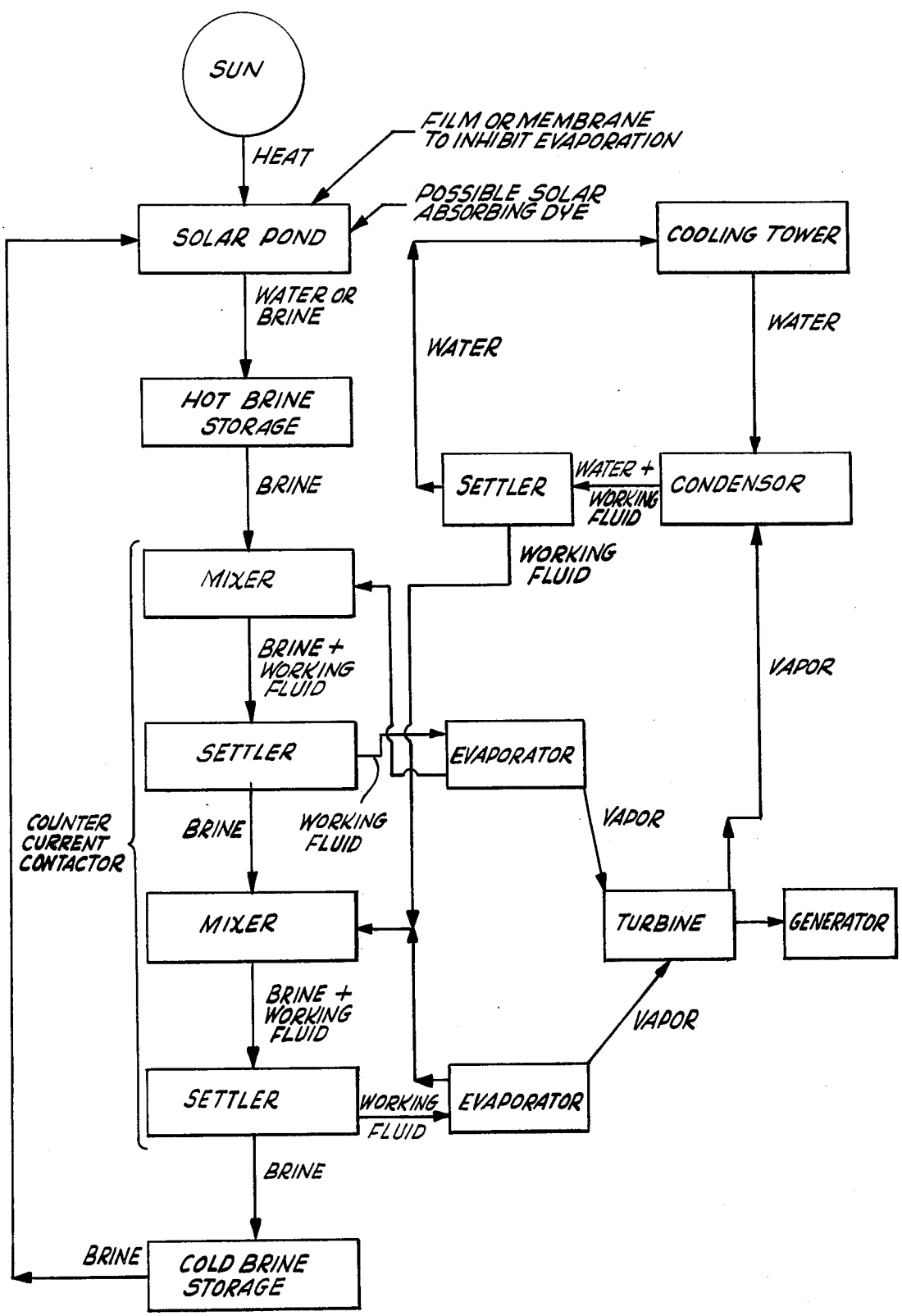

ENERGY PRODUCTION FROM SOLAR PONDS

BACKGROUND OF THE INVENTION

The present invention relates generally to a method of solar energy collection and conversion. More particularly, the present invention relates to an economical method for obtaining energy in a useful form, e.g., heat or electric power from solar pond collectors.

Many methods and devices have been proposed whereby solar energy is utilized or converted to electricity. The greatest emphasis in recent years has been on devices which employ mirrors for focusing and reflecting solar energy to heat vapor generating equipment and thereafter convert solar energy to electricity. Additionally, prior devices have utilized photoelectric converters to obtain electricity from solar energy directly. However, the prior devices are expensive, inefficient and only capable of being built in relatively small sizes. They therefore have had application only in special situations such as where conventional sources of power are unavailable, i.e., remote areas or outer space. Other methods of converting solar energy to useful work have included the use of solar heaters, solar boilers for hot water heaters, etc. However, all of the foregoing methods and devices tend to be expensive, inefficient or very limited in their application owing to their high cost and limited size of the collector system.

SUMMARY OF THE INVENTION

In contrast to the foregoing prior art methods, I have now discovered a simple and inexpensive method for collecting and subsequently converting solar energy to useful work by using solar ponds or the like. In carrying out my invention, hot water or other liquids from a relatively shallow solar pond covered with a fluid or solid phase film membrane is first pumped into storage reservoirs, during the day, after the liquid has reached its maximum temperature. The hot liquid is then heat exchanged by direct or indirect contact with a comparatively low temperature boiling point immiscible working fluid, e.g., isopropanol or compressed gas to allow maximum heat exchange between the two fluids. The resulting mixture is then processed to obtain phase separation. After the phases have separated, the now heated immiscible working fluid is caused to rapidly evaporate, e.g., by flash drum evaporation, and its vapors used to drive a power generating turbine.

Several stages of counter current contact may be made with one or more immiscible working fluids to allow maximum heat recovery. In one embodiment, the spent vapors may be condensed by direct contact with cooling tower water and the resulting fluid recovered from a settling drum after the two liquid phases have separated. Thereafter, the immiscible fluid may be recycled within the system.

The cold pond liquid from the final heat exchange is stored in a reservoir and returned to the solar pond as the hot pond liquid is removed. Alternatively, the cold liquid may be returned to the pond in the cooling morning hours.

The liquid in the solar pond may contain a dye or other light absorbing material to provide an efficient absorption of the available solar energy. It is a particular feature of this invention that an evaporation inhibiting layer is placed on the surface of the solar pond to minimize evaporation losses and thereby maximize the heat retained by the pond. Further, the use of the layer reduces the makeup required for the system. The evaporation inhibiting layer may be composed of a floating oil or other immiscible liquid, surface active agents, e.g., octylamine, or a floating solid phase film cover. If a disposal of some liquids, or brines in the pond is desired, or if salt production is desired from brines used in the pond, the aforementioned light absorbing and covering materials may be initially used in the pond to provide internal heat build-up in the pond liquid. After contact with the working fluid has been effected, the layer is removed to allow evaporation to occur at a later point in the process. Thus, the desired salts may be crystallized and the unwanted liquids discarded at some time after the heat energy has been transferred to the immiscible working fluid.

Accordingly, the foregoing method may be used in conjunction with existing commercial solar pond operations to produce power as well as recovering salt or other chemicals from the pond liquid. In this manner, the present invention provides a relatively inexpensive system useful on any scale in a wide variety of locations which can efficiently recover the energy from sunlight in the form of useful energy, e.g., heat or electric power.

BRIEF DESCRIPTION OF THE DRAWING

FIG. 1 is a flow diagram of a preferred embodiment of the invention utilizing water as the solar pond liquid and multiple stage contact of the water with a single working fluid to provide transfer to the fluid of the accummulated heat energy in the water.

DETAILED DESCRIPTION OF THE INVENTION

Solar energy utilization at the present time is quite limited by rather expensive collection equipment, and low efficieny in energy recovery. Photo-electric devices have been used successfully on satellites and remote locations, but such devices posses a very limited capacity for generating electricity. Further, they are expensive and only achieve a small percentage conversion of the solar energy into electricity.

Considerable research has been done, and is still continuing, on the use of mirrors to reflect solar energy into a more concentrated area to boil water at reasonably high temperatures and pressures. The resulting steam is then utilized to drive turbines. This method suffers from the cost of the very extensive mirror system and the complexity of its arrangement, thus the method has limited practicality.

In contrast to these two methods, I have found that inexpensive open solar ponds can be efficiently used to heat water, brine, or other liquid more effectively for solar energy collection. The ponds may be constructed so that the temperature of the liquid is maximized and evaporation is minimized. The hot liquid can be utilized throughout a 24-hour operational period by the use of adequate storage facilities.

More particularly, the hot liquid is contacted with a lower boiling point working fluid, to drive turbines of a reasonable size and expense. In so doing, a fairly high percent utilization of the solar energy is obtained with equipment that is comparatively modest in cost.

Solar ponds may be located essentially in any reasonably flat area, providing that an acceptable leak-free pond can be constructed. This is a simple matter if the area contains impermeable clays. However, if the soil is permeable, various techniques must be used to provide a leak-free operation. These techniques include the use of a synthetic membrane liner composed of polyvinyl chloride, butyl rubber, or other impermeable materials; or by compacting the soil and/or adding sealing agents to a semi-impermeable soil. It is also possible that clay or various chemicals may be used as a sealant in certain situations. The techniques of building adequately leak-free solar ponds are well known in the art of industrial chemicals recovery from solar ponds, such as in the production of salt, potash, soda ash, salt cake, etc.

In a similar manner a great deal of industrial knowledge and experience is available on the building of ponds. However, obtaining maximum temperatures from the pond liquids and minimizing the evaporation of the liquids has not heretofore been accomplished in the context of my invention.

It has now been found that efficient solar energy collection can be accomplished through the use of comparatively shallow ponds having a depth of about 6 to 12 inches, and the use of a dye that provides nearly complete absorption of the solar energy. Further, it is also desirable to have dark colored pond bottoms such as those produced by natural clays, etc. to provide maximum absorption. Light absorbing dyes of the type useful in this invention are set forth in the following U.S. Pat. Nos. 3,138,546, 2,383,762 and 2,383,763, relevant portions of which are hereby incorporated by this reference.

By directing the pond liquid through a multi-pond system in a manner, e.g., with baffles, interior dikes, etc., to substantially prevent "short circuiting", and by the use of pond liquids such as higher boiling point magnesium chloride brine solutions (which are often residual solutions from a sea water or related brine type of evaporation) it is possible to obtain temperatures in solar ponds above the boiling point of water. However, oil, water or any aqueous solutions can be used, as the pond liquid. Absorption of available solar energy will consistently provide the liquid with a temperature between 120° F to 200° F during the summer months. Thus, with extra effort and attention, the ponds can be designed to achieve higher temperatures, solar energy in most areas of the world capable of heating the pond liquids from 150° F to 250° F over the period of withdrawal. Average pond liquid temperatures going to a hot storage tank of the collection system will be on the order of 150° F.

Solar ponds are normally utilized to evaporate the contained waters as their chief function. In contrast, in the present invention heat recovery is the main objective. Accordingly it has been found advantageous to place an evaporation-inhibiting film on the ponds to minimize or prevent evaporation of the pond liquid. Covering agents such as floating oils, other immiscible fluid or surface active agent, e.g., octylamine, etc., are suitable for this purpose. Methods for producing evaporation-inhibiting films are known in the art and have been successfully used for fresh water reservoirs where evaporation is not desired.

In accordance with the present invention, a monomolecular or very thin film of a heteropolar organic compound can be formed that will almost totally prevent evaporation of the solar pond liquid. This allows most of the heat that has been absorbed from available solar energy to be utilized for internal heat generation in the liquid rather than external heat loss through evaporation of the liquid. In some cases, actual membranes of polyvinyl chloride, polyethylene, floating spheres, panels or other suitable materials may be placed on the surface of the pond to simultaneously assist with both the solar absorption and reduction of evaporation. Floating solid phase membranes, or thicker heavier films have less of a tendency to be displaced from the pond surface. In this manner, only a small amount of make up liquid is required to replenish losses in the pond system. This can be accomplished with local brackish waters or any other solutions that may be available for disposal. Films of the type useful in the present invention are more fully disclosed in U.S. Pat. Nos. 3,509,716 and 3,138,546, relevant portions of which are hereby incorporated by this reference.

It is also possible to combine the advantages of this invention for power generation with that of normal solar ponds operation, i.e., for liquid disposal or the production of salts. By circulating the hotter brines from such solar ponds through the system described herein, considerable heat recovery can be made in the form of power, as well as obtaining the benefits of solution disposal or the production of chemicals. The pond waters will not achieve a maximum heat build-up but a dual function will be realized.

Referring to the drawing which illustrates the preferred embodiment of the invention, hot liquid, e.g., brine, is withdrawn from the solar pond covered with an evaporation-inhibiting layer and optionally containing a solar absorbing dye. While the preferred pond liquid is a brine, it will readily be appreciated by those skilled in the art that water or other suitable liquids can be utilized. The liquid is pumped into hot storage tanks or ponds in the elevated daytime temperature and held for desired use. After the hot liquid is withdrawn from the pond, it is replaced with cold liquid returning from the system's cold storage tank. Alternatively, the cold liquid may be returned at a time later than the hot liquid extraction. Preferably, in order to minimize heat loss, it is desired to empty the hot water or brine from the ponds rather rapidly in the late afternoon, by using comparatively larger pumps so that full advantage may be taken of the liquid at its highest temperature. The pumps should be selected with a high efficiency and as low energy requirement as possible. This requires an optimally designed pumping system as well as pond layout which expends minimum energy by requiring a minimum pumping elevation for the system. In this manner, the energy requirement for pond liquid movement can be kept to a minimum, and will not represent a significant portion of the total power output of the system. The hot liquid storage tank should be well insulated, as should all of the piping in the system.

Brine is withdrawn from the hot brine storage tank at a uniform rate throughout the day, and sent to a mixer (heat exchanger), such as a counter-current phase-contacting centrifuge where the brine is contacted with a low boiling point immiscible working fluid. The direct contact heat exchanger is exceedingly rapid and after a few minutes of contact the brine working fluid mixture is passed to a settling chamber (disengager) where the brine is separated from the working fluid. The working fluid phase is withdrawn from the mixture and directed to an evaporator such as a flash drum or the like where the working fluid is flash vaporized at a slightly reduced pressure. The resulting working vapors are then passed into a turbine which in turn drives a generator. The spent vapors exiting the turbine are condensed by water from a cooling tower in heat exchangers or direct contact barometric condensers. Thereafter, the condensed working vapor-water mixture is directed to a settling tank where the working fluid separates from the cooling tower water. The working fluid is subsequently returned to the original mixing tank, and the cooling water returned to the cooling tower for use in a new energy transfer cycle.

In accordance with the present invention, suitable working fluids include butane, isopropanol, Freons, and many others with specifically optimized properties, e.g., pressure-temperature, cost, disengagement, etc.

The term low boiling point working fluids is used in this specification to denote fluids which will vaporize within a temperature range of about $-212°$ F to $212°$ F at atmospheric pressure. A boiling point temperature range of $80°-100°$ F at atmospheric pressure is preferred for the working fluid. The parameter of pressure for the working fluid will range from about atmospheric to 1000 psi, with a pressure range of 300–400 psi being preferred.

Thus, if the working fluid has a boiling point less than that of the average pond liquid temperature, pressurized contact and settler equipment will be required to maintain the working fluid in a liquid state.

Those skilled in the art will appreciate that the parameters for the working fluid can be readily chosen to provide optimized properties for the heat transfer and vaporization steps of the present invention. Similarly, equipment for the liquid-fluid system may be selected having optimized properties such as high heat transfer efficiency and low energy requirements. The preferred mixer-settler for the system is a counter-current centrifugal contactor-separator where the pond liquid is directly contacted with the working fluid and subsequently separated by centrifugal force. However, suitable mixers, settlers, vaporizers, turbines, thermodynamic motors, etc. for the system can be readily chosen from a wide variety of available equipment. Equipment of the type useful in the present invention are more fully disclosed in Perry's Chemical Engineer's Handbook, 4th ed., relevant portions of which are hereby incorporated by this reference.

While the preferred mechanical working device for converting the absorbed heat energy to electricity is a turbine, any thermodynamic motors or power generating device can be employed.

In yet another embodiment, the heat developed from solar energy absorption in the pond liquid, can be used directly without vaporization as by channeling the heated pond liquid, or working fluid through a piping network to provide heat for a building structure. Similarly, the heat energy can be used to provide the heat requirement for a medium endothermic chemical process.

Preferably, a number of stages of direct or indirect contact heat exchangers are employed. In addition, one or more additional working fluids of progressively lower boiling points are also used for maximum heat recovery from the pond liquid at later stages. Use of additional working fluids results in the production of high vapor pressures which is more efficient in powering the turbines. If several working fluids are used, distillation columns may be readily employed to take a small bleed stream from the system to prevent excessive contamination of one working fluid with another. The boilers in the distillation columns may be heated by indirect or direct contact heat exchanger with the hot pond liquid.

Larger settling chambers, centrifuges, etc. are used in the last settling stage to reduce the amount of unavoidable working fluid entrainment to a minimum amount. Following the final settling stages, if desired, additional methods for removal of the last traces of working fluid from the brine may be employed. These methods include filtration with activated carbon, or steam, hot-air blowing depending on the working fluid. Following separation, the cold brine is passed to a cold brine storage tank where the spent pond liquid is kept until it is returned to the solar ponds and the total cycle repeated.

The advantages of the process herein described are primarily the simplicity of energy conversion, and low cost for large solar collectors. Further, the present process has an ease of operation and maintenance, low capital cost, and high energy recovery. Solar ponds are commonly built throughout the world, and details of their construction and operation are fairly well known. Such ponds can be employed in many locations that are otherwise unsuitable for farming, agriculture, dwellings, or other more productive use. Thus land that has little or no value can become valuable as an energy collection area. The process requires rather simple materials, such as water, brines, dyes, and evaporation retarding films for operation. The maximum solar energy is utilized at its highest temperature form without employing complex mirrors, glass walls, piping or bag networks, intricate electronics, etc. The use of low boiling point organic immiscible working fluids allows the turbine size to be comparatively small because of the high pressures available.

In general, the entire system is simple and inexpensive, and because of the very close $\Delta T$'s allowable between two fluid heat exchange, and the ability of the lower boiling fluids to operate to a comparatively low temperature, the system is comparatively thermally efficient. The utilization of an evaporation inhibiting film provides for and greatly enhances higher temperatures in the pond liquids.

I claim:

1. A method for collecting and converting solar energy to work, the method comprising the steps of:
    a. providing a liquid in at least one solar pond for absorbing available solar energy, maintaining the liquid in the pond for a sufficient residence period to heat said liquid to an average temperature of from about 100° F. to about 250° F.;
    b. effecting a contact of the heated pond liquid obtained from step (a) in a prescribed sequence with multiple immiscible working fluids to effect a heat transfer from said pond liquid to said working fluids, said working fluids each having a progressively lower boiling point temperature;
    c. separating the working fluids obtained from step (b) from said pond liquid;
    d. vaporizing said working fluids and utilizing the vapors resulting therefrom to drive a mechanical working device to produce work.

2. The method of claim 1 wherein the liquid contained in the solar pond is covered with an evaporation-inhibiting layer that permits absorption of solar energy into the pond liquid.

3. The method of claim 2 wherein the evaporation-inhibiting layer is a solid film membrane selected from the group consisting of polyvinyl chloride, polyethylene and polypropylene.

4. The method of claim 2 wherein the evaporation-inhibiting layer is composed of a liquid-phase material having a density of less than said pond liquid.

5. The method of claim 1 wherein the pond liquid contains a light absorbing dye.

6. The method of claim 1 wherein said pond liquid is selected from the group consisting of water, brines and oils.

7. The method of claim 1 wherein said pond liquid is a magnesium chloride brine.

8. The method of claim 1 wherein said immiscible working fluids have a boiling point temperature within the range of from about $-212°$ F to about $+212°$ F at atmospheric pressure.

9. The method of claim 1 wherein said working fluids is selected from the group consisting of propane, isopropanol, butane and freons.

10. The method of claim 1 wherein said step of contacting the heated pond liquid is effected by a direct contact of the heated pond liquid with the immiscible working fluids.

11. The method of claim 10 wherein said direct contact is effected by a counter-current phase-contacting centrifuge.

12. The method of claim 1 wherein the steps of contacting and separating said working fluids from the pond liquid is effected by a counter-current centrifugal contactor-separator.

13. The method of claim 1 wherein the step of vaporizing said working fluids is effected by a flash evaporation drum.

14. The method of claim 1 and further including the step of condensing and recycling the working fluid vapors subsequent to driving a mechanical working device.

15. The method of claim 14 wherein the step of condensing the working fluid vapors is effected by a cooling tower.

16. The method of claim 1 and further including a distillation step for separating and recovering the progressively lower boiling point working fluids.

17. The method of claim 1 and further including the step of recovering any dissolved salts present in the pond liquid.

18. A method for collecting and converting solar energy to work, the method comprising the steps of:
    a. providing water in at least one solar pond for absorbing available solar energy, maintaining the water in the pond for a sufficient residence period to heat said water to an average temperature of from about 100° F. to about 250° F.;
    b. flowing the heated pond water obtained from step (a) to a storage reservoir;
    c. mixing a portion of the heated pond water from said storage reservoir with multiple immiscible working fluids in a sequential contact with said pond water to effect a heat transfer from said water to the working fluids, said working fluids each having a progressively lower boiling point temperature;
    d. allowing the mixture obtained from step (c) to effect substantial phase separation between said pond water and said working fluids;
    e. separating said working fluids from said pond water;
    f. rapidly vaporizing said working fluids and utilizing the vapors obtained from the rapid vaporization of said working fluids to power a turbine to produce work and thereafter condensing the working fluid vapors for recycling to step (c).

19. The method of claim 18 wherein the working fluids are is selected from the group consisting of butane, isopropanol and freons.

20. The method of claim 19 wherein the water phase is recovered in the separation step and returned to the solar pond.

21. The method of claim 20 wherein multiple contacting and separating steps are utilized to maximize heat transfer from the water to the working fluid.

22. The method of claim 18 wherein the water contained in the solar pond includes a light absorbing dye.

23. The method of claim 18 and further including the step of recovering any dissolved salts present in the pond water.

24. The method of claim 18 wherein the heat transfer is effected by a counter-current contact of the water and the working fluids.

25. The method of claim 18 wherein at least one working fluid is a compressed gas which is in a liquid state during mixing with the heat pond liquid.

26. The method of claim 25 wherein said compressed gas is maintained at a pressure of from about 300–400 psi.

27. The method of claim 18 wherein the water contained in the solar pond is covered with an evaporation-inhibiting layer that permits absorption of solar energy into the pond water.

28. A method for collecting and utilizing solar energy, the method of comprising the steps of:
    a. providing a liquid in at least one solar pond for absorbing available solar energy, maintaining the liquid in the pond covered with an evaporation-inhibiting layer for a sufficient residence period to heat said liquid to an average temperature of from 100° F to 250° F.;
    b. effecting a contact of the heated pond liquid obtained from step (a) in a prescribed sequence with multiple immiscible working fluids to effect a heat transfer from said pond liquid to said working fluids, said working fluids each having a progressively lower boiling point temperature;
    c. separating the working fluids obtained from step (b) from said pond liquid;
    d. vaporizing said working fluids and utilizing the vapors resulting therefrom to provide a heat source from an auxiliary system.

29. The method of claim 28 wherein the auxiliary system is a piping network which provides heat for a building structure.

30. The method of claim 28 wherein the auxiliary system is an endothermic chemical process.

31. The method of claim 28 wherein said pond liquid maintained in the pond contains a light absorbing dye.

* * * * *